Figure 1:
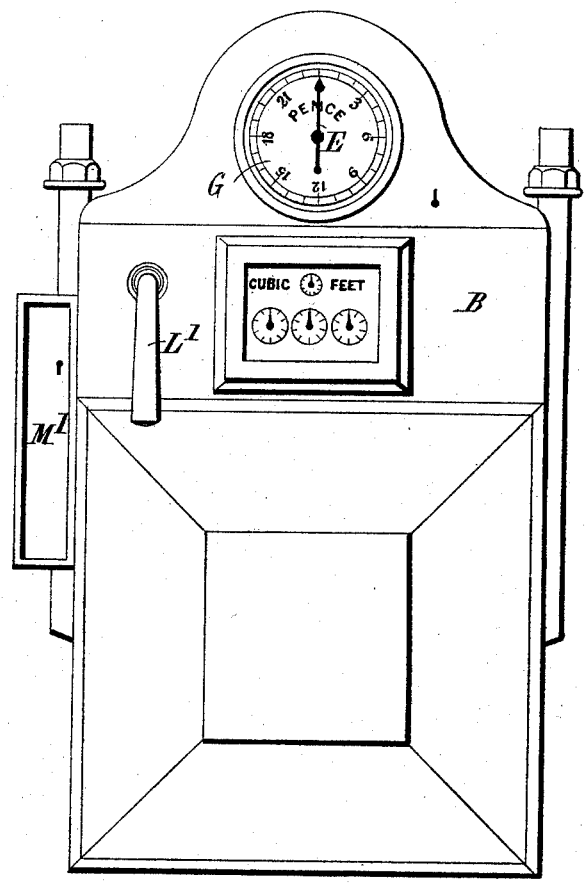

(No Model.)

10 Sheets—Sheet 1.

S. SIMPSON.
COIN CONTROLLED GAS OR OTHER METER.

No. 526,640.

Patented Sept. 25, 1894.

Witnesses,
G. W. Rea
Thos. A. Green

Inventor;
Stephen Simpson
By James L. Norris.
Atty

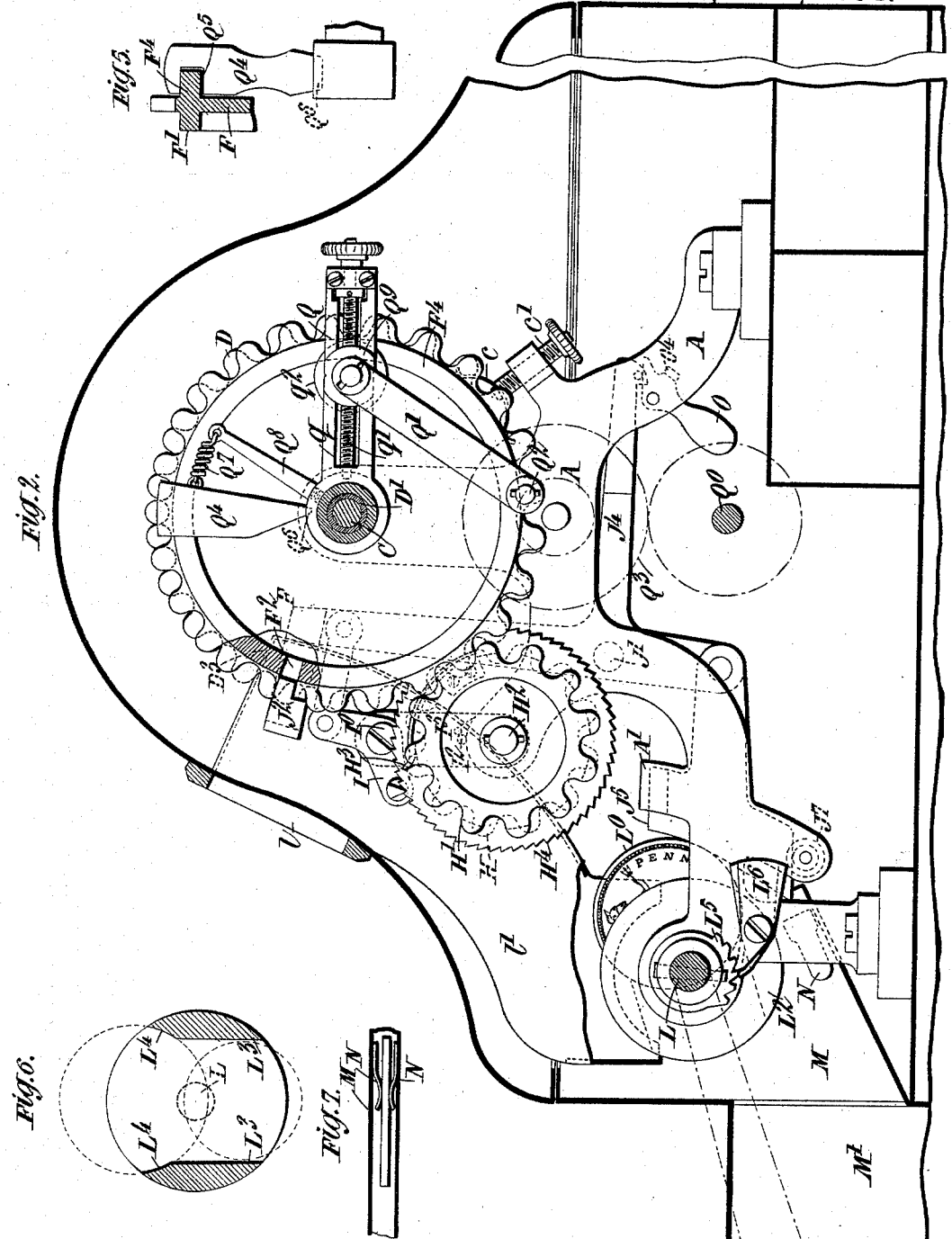

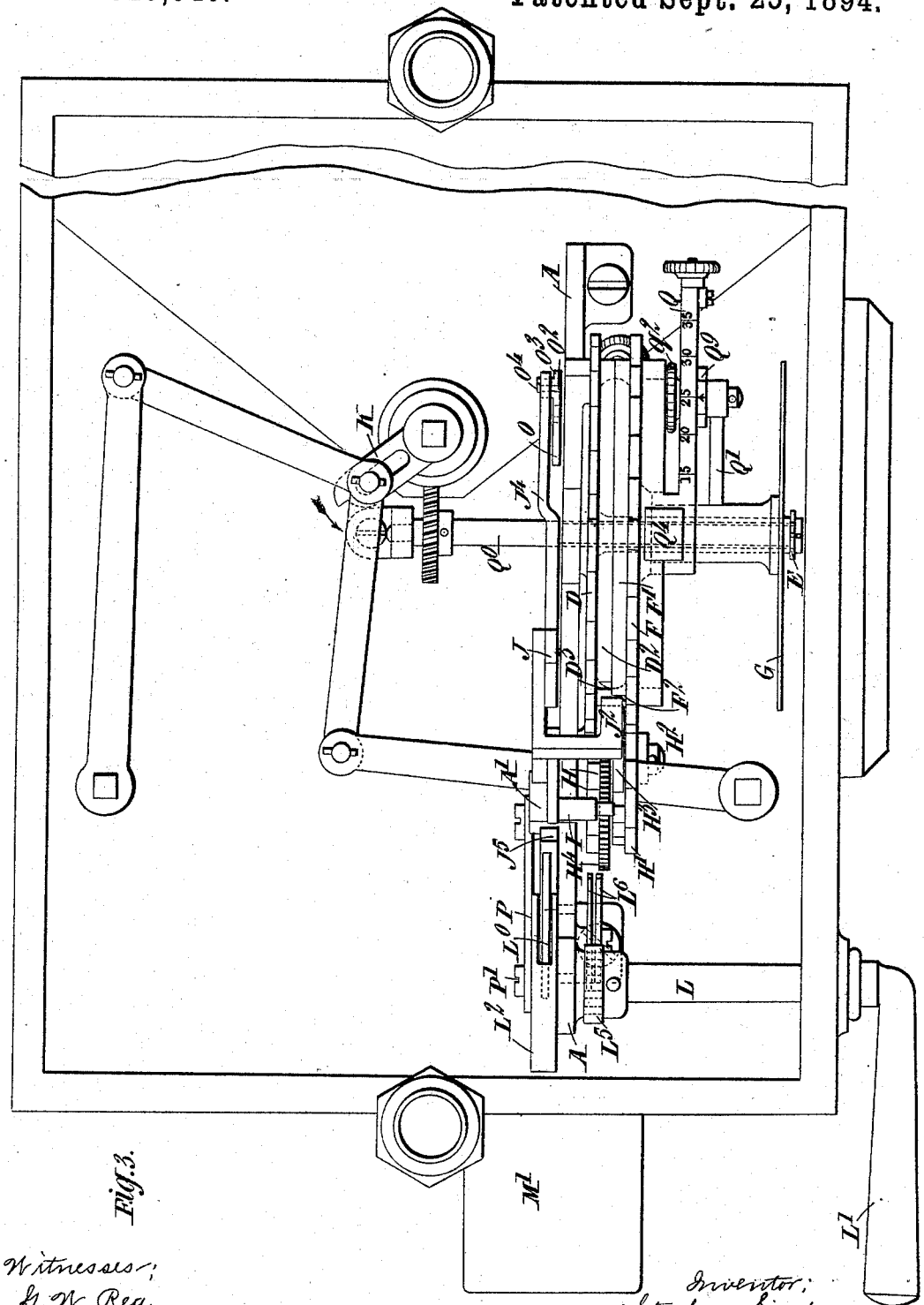

(No Model.) 10 Sheets—Sheet 4.
S. SIMPSON.
COIN CONTROLLED GAS OR OTHER METER.
No. 526,640. Patented Sept. 25, 1894.
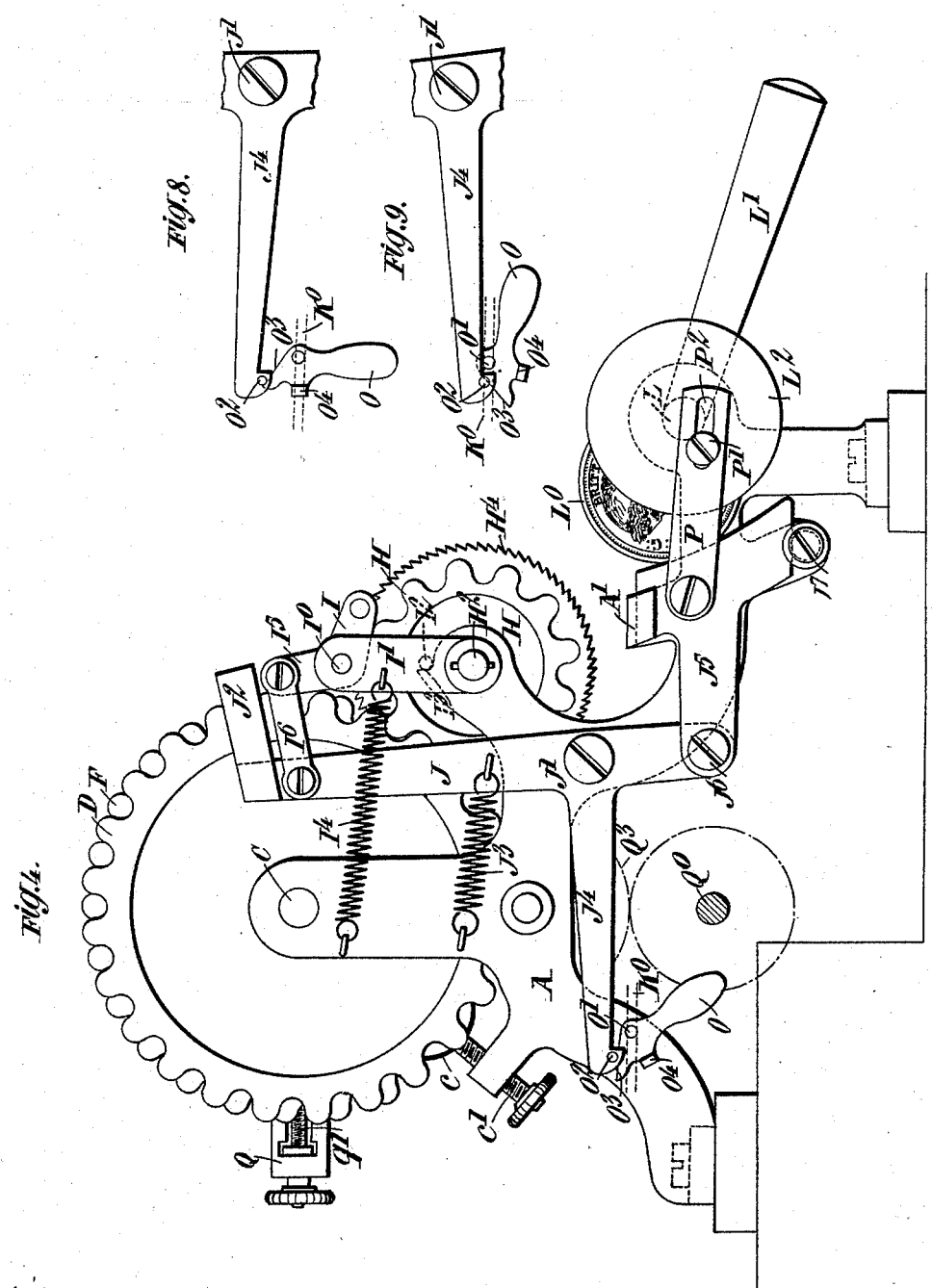
Witnesses:
G. W. Rea.
Thos. A. Green
Inventor:
Stephen Simpson,
By James L. Norris.
atty (No Model.)  S. SIMPSON.  10 Sheets—Sheet 5.
COIN CONTROLLED GAS OR OTHER METER.
No. 526,640.  Patented Sept. 25, 1894.
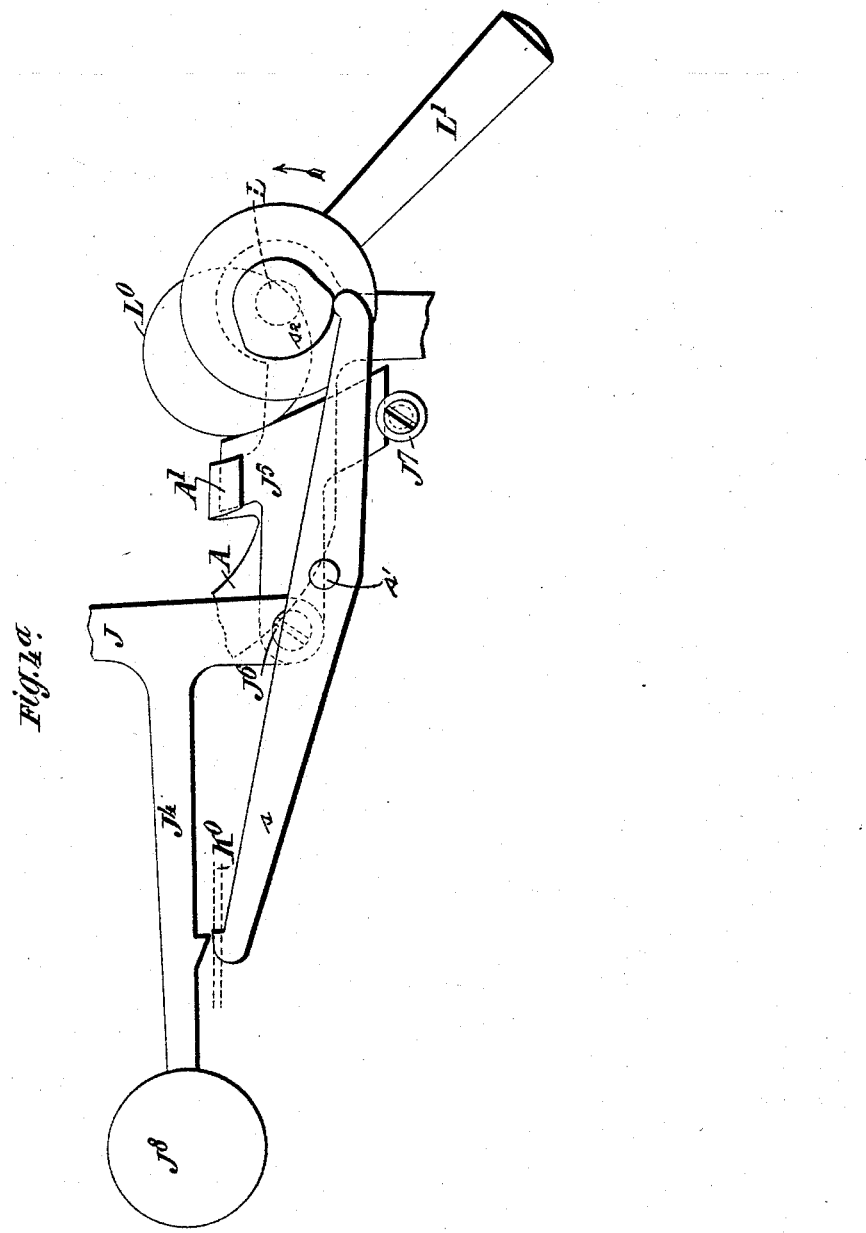

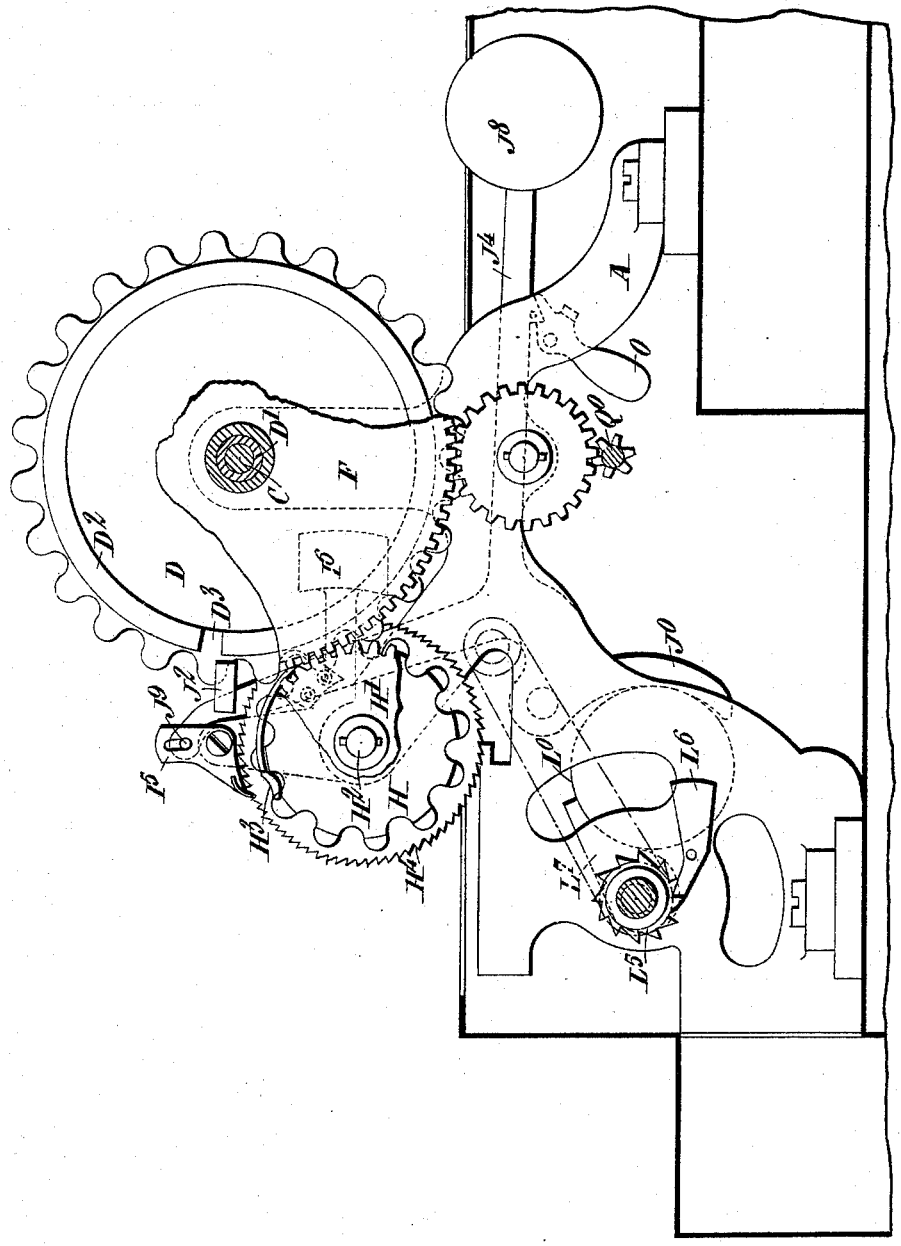

(No Model.) 10 Sheets—Sheet 7.
S. SIMPSON.
COIN CONTROLLED GAS OR OTHER METER.
No. 526,640. Patented Sept. 25, 1894.
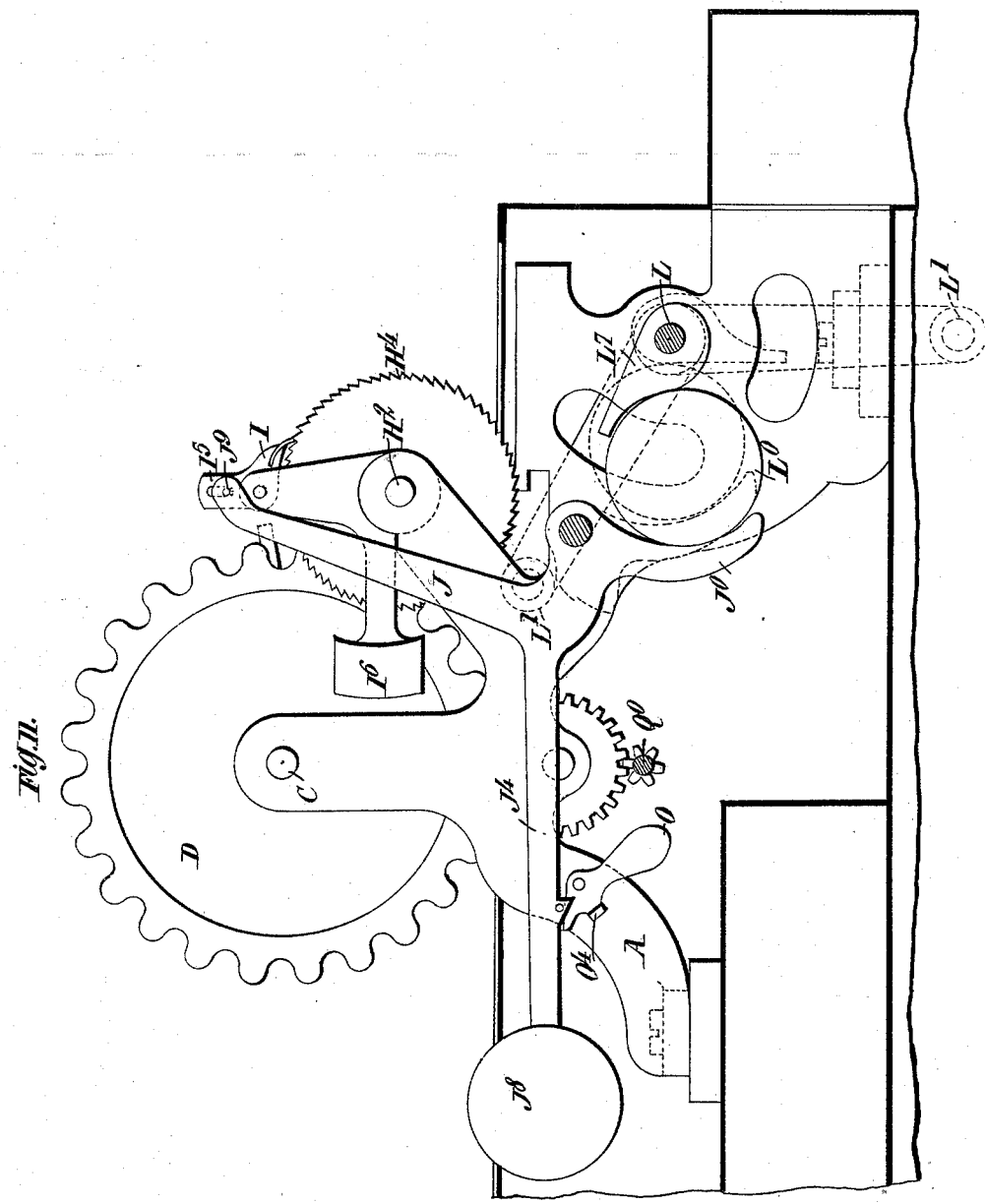
Witnesses:
G. W. Rea.
Thos. A. Green
Inventor:
Stephen Simpson,
By James L. Norris,
Atty

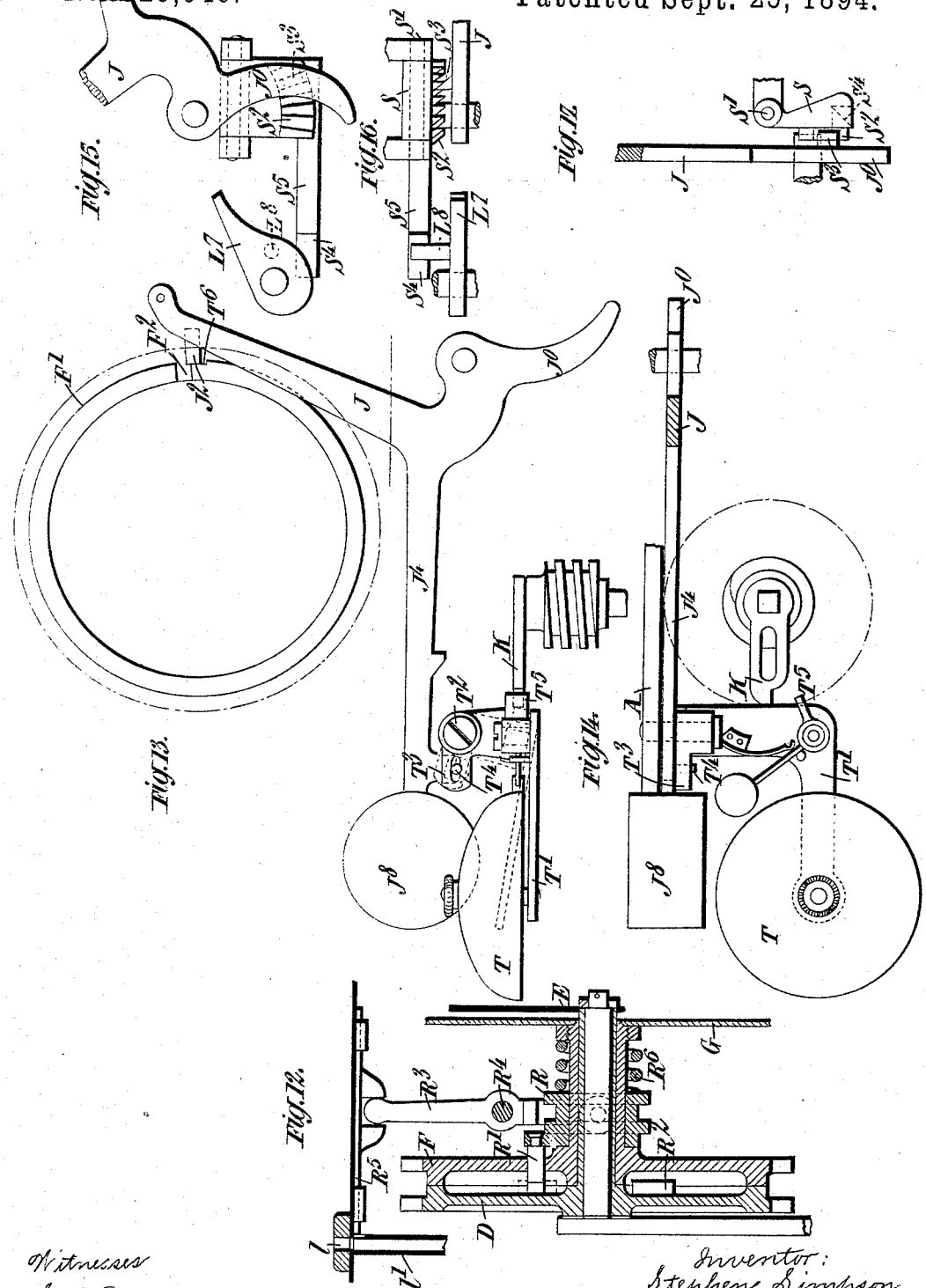

(No Model.) 10 Sheets—Sheet 9.
S. SIMPSON.
COIN CONTROLLED GAS OR OTHER METER.
No. 526,640. Patented Sept. 25, 1894.
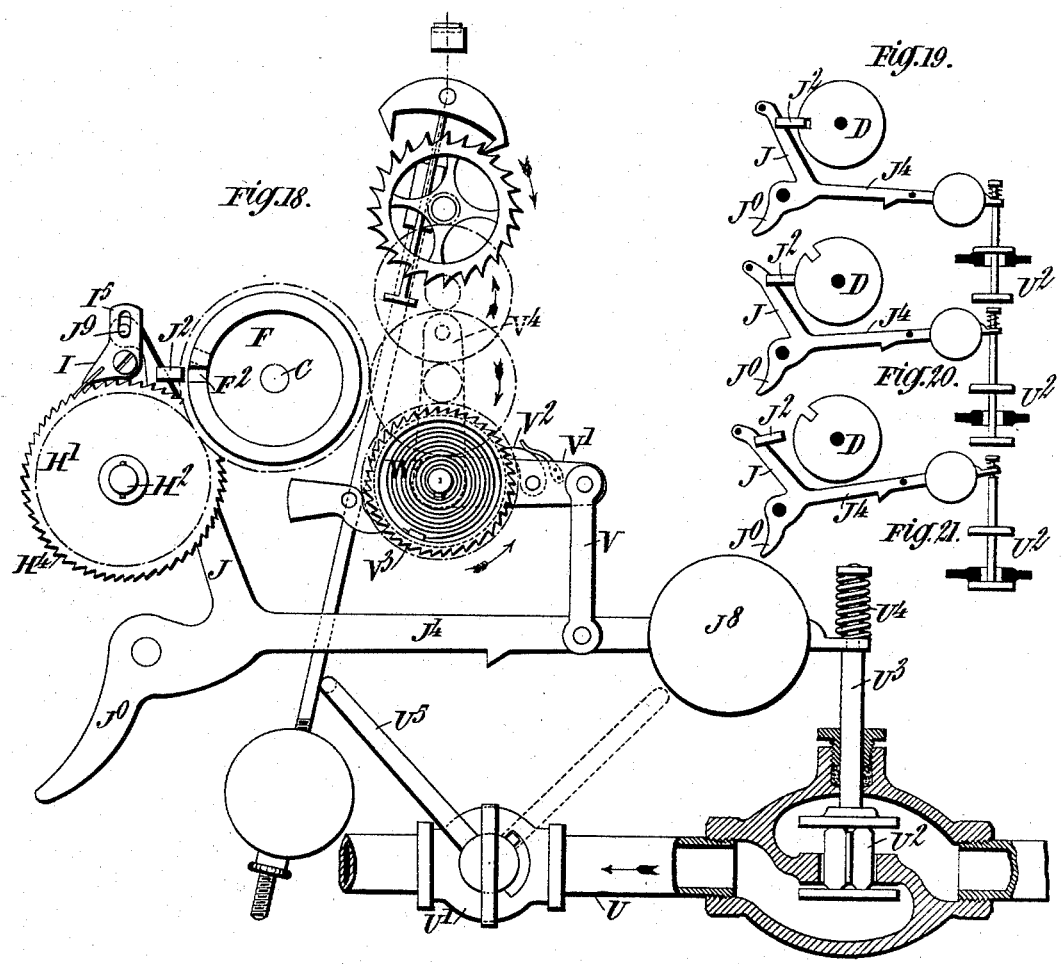

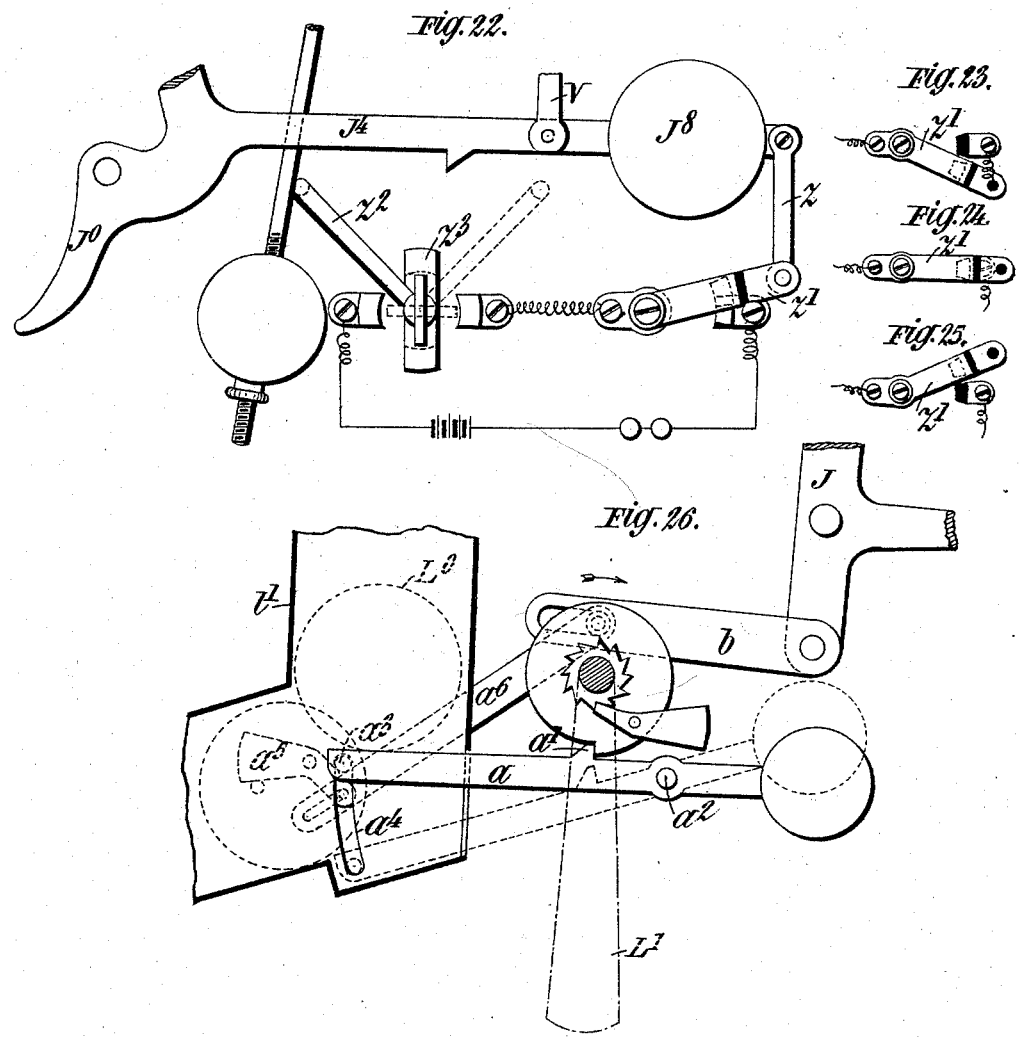

UNITED STATES PATENT OFFICE.

STEPHEN SIMPSON, OF MANSFIELD, ASSIGNOR OF ONE-HALF TO FRANCIS EDWARD DYKE ACLAND, OF LONDON, ENGLAND.

COIN-CONTROLLED GAS OR OTHER METER.

SPECIFICATION forming part of Letters Patent No. 526,640, dated September 25, 1894.

Application filed March 13, 1894. Serial No. 503,502. (No model.)

*To all whom it may concern:*

Be it known that I, STEPHEN SIMPSON, engineer, a subject of the Queen of Great Britain, residing at Albert Works, Mansfield, in the county of Nottingham, England, have invented certain new and useful Improvements in Prepayment Mechanism Applicable to Gas, Electricity, or Like Meters, of which the following is a specification, reference being had to the accompanying drawings.

This invention relates to improvements in prepayment mechanism applicable to gas, electricity and like meters, in which a predetermined quantity of gas or other fluid, or electricity is supplied in exchange for coin, or in which the supply of gas, or other fluid or electricity is continued for a predetermined time, in exchange for such coin.

The object of the invention is to provide simpler and more efficient mechanism than that hitherto used in such apparatus.

The chief feature of my said invention is the provision of differential wheels for controlling the supply of gas or other fluid, said wheels being used in combination with a pair of spring-connected pinions which serve to gradually restore the differential wheels to their initial relative position as the mechanism rotates after one of said wheels has been turned with respect to the other through an angle depending on the number of coins passed through the apparatus.

Another important feature of this invention relates to the means employed for adjusting one of said wheels with respect to the other as the coins are passed through the apparatus as above indicated.

Other important features of my said invention relate to the mechanism for adjusting the supply of gas or other fluid or electricity to be supplied for the coin to be inserted, and to the mechanism for passing the coin through the apparatus.

My said invention also comprises other features of improvement hereinafter fully described.

Referring to the accompanying drawings, Figure 1 is a front elevation of a gas meter provided with my improved mechanism for regulating the supply of gas. Fig. 2 is a section through the upper part of the casing drawn to a larger scale showing one form of my improved mechanism in front elevation, a part being shown in section, and the dial being removed. Fig. 3 is a plan of the parts shown in Fig. 2, and showing also the connection with the ordinary mechanism of the meter. Fig. 4 is a rear elevation of the mechanism detached from the casing. Fig. 4$^a$ shows a slight modification of a stop mechanism hereinafter described. Fig. 5 is a side elevation of the silent feed pawl hereinafter described. Fig. 6 is a section of the coin holder, showing the slot for passing small coins as hereinafter described. Fig. 7 is a plan of a portion of the coin delivery chute showing the coin-gripping springs hereinafter described. Figs. 8 and 9 show a locking arm and a locking stop for the meter mechanism in two different positions both different from the position of said parts shown in Fig. 4. Fig. 10 is a front elevation, and Fig. 11 is a rear elevation of a slightly modified form of the mechanism wherein weights are substituted for springs to control the feeding levers, and a cam is provided for forcing the coin through the apparatus into the delivery chute. Fig. 12 is a sectional side elevation of mechanism provided for closing the coin slit in the casing when a predetermined number of coins have been inserted. Fig. 13 is a side elevation, and Fig. 14 is a plan of a bell and its attachments for giving warning when the quantity of gas or other fluid to be delivered for the coin or coins inserted is nearly exhausted or when the time contracted for has nearly expired. Fig. 15 is a side elevation, Fig. 16 is a plan, and Fig. 17 is an edge view of a modified device to prevent the use of the same coin continuously for fraudulently working the apparatus by a method which is known as "pumping." Fig. 18 shows in side elevation, detached from the casing, a chronometric apparatus, that is to say, apparatus which supplies the fluid for a predetermined length of time. Figs. 19, 20 and 21 show on a smaller scale three positions of the valve of such apparatus and its controlling lever hereinafter referred to. Fig. 22 illustrates the application of my improved apparatus for measuring electricity. Figs. 23, 24 and 25 show three positions of the switch hereinafter described. Fig. 26 illustrates a modification of my apparatus, wherein the weight of the coin is used solely for liberating the handle to allow of the latter being rotated to obtain a supply of fluid.

Like reference-letters denote corresponding parts in all the figures.

Referring first to Figs. 1 to 9 A is a frame made of suitable material, preferably brass, or cast iron, and constructed to be conveniently attachable to the case B of the meter, and formed to carry the coin-controlled mechanism. To the upper part of this frame, I fix a stud C on which revolves loosely a toothed wheel D having say twenty-four or other convenient number of teeth. The said wheel D has a boss D' extending to the end of the stud and on said boss a suitably formed pointer or finger E is attached. Carried loosely on the boss of this wheel D between it and the finger E, is a wheel F having say twenty-five teeth, or one more than the wheel D. The adjoining faces of these wheels are furnished with projecting rims or flanges $D^2$, F' respectively. These rims or flanges are of the same diameter, and bear against each other, and have each a slot or groove $D^3$, $F^2$ respectively cut in the periphery for a purpose to be hereinafter described.

$c$ is a spring bearing on the rim $D^2$ of the wheel D and controlled by an adjusting screw $c'$. This spring serves to steady the wheel D which, as above stated, is loose on its spindle.

The wheel F carries on the end of its boss a dial G which is divided into the same number of parts as there are teeth in the wheel D, or a convenient or suitable multiple thereof, and it is geared with the ordinary mechanism of the meter either directly or indirectly by means of an additional toothed wheel formed with or connected to it, the gear being so proportioned that the said wheel F makes one revolution during the predetermined time during which the apparatus shall be in action, or while the pre-arranged quantity of gas or other fluid is being delivered in exchange for the coin arranged to be tendered in payment therefor; or the wheel F is driven by a silent feed clutch as shown in Figs. 2 and 5 hereinafter more particularly described. Gearing into the toothed wheels D, F are two smaller toothed pinions H, H' of convenient size, having the same number of teeth as each other and revolving loosely on a fixed stud $H^2$ attached to the frame A. It is not necessary that the wheel F shall have the number of teeth hereinabove mentioned. It may have any convenient multiple of such number, provided that the number of teeth in its corresponding pinion H' is also multiplied in the same proportion. For example in Figs. 10 and 11 I have shown the wheel F with seventy-five teeth, and the pinion H' with thirty-six teeth. This proportion reduces the size of the teeth to very convenient dimensions suitable to be geared directly with the meter mechanism.

The pinion H' is made of greater width than the wheel into which it gears, and in this extra width there engages a spring pawl $H^3$, or equivalent device which is pivoted or attached to the other pinion H. This spring ordinarily locks the two pinions together, but allows the pinion H to be turned one or more teeth with respect to the pinion H' when required, the second pinion H' being meanwhile held stationary by the propelling mechanism of the wheel F, that is to say, by the ordinary meter mechanism. In the drawings, the pawl $H^3$ is shown engaging with a part of the wheel H' which is of slightly reduced diameter. I move or advance the pinion H by means of a pawl I, Fig. 4, pivoted at $I^0$ to a short lever I' which preferably swivels on the stud $H^2$ that carries the two pinions H, H'. The said lever I' is furnished with a pin $I^2$ which is normally held against a stop $I^3$ by means of a suitable spring $I^4$. The pawl I is so shaped as to be able to engage with the teeth of the pinion H, or preferably as shown in Fig. 4 with the teeth of a ratchet wheel $H^4$ fixed to the pinion H, and is provided with an arm $I^5$ which is connected by means of a link $I^6$ or its equivalent to the upper part of a longer or second lever J pivoted at J' to a part of the frame A.

The upper part of the lever J is formed with a hook shaped projecting part or finger $J^2$ which bends round the teeth of the wheel D and rests or bears on the peripheries of the rims or flanges $D^2$, F', hereinbefore described, of the wheels D, F. The lever J is normally held in this position by a spring $J^3$, and when so held the pawl I is, by the link $I^6$, kept clear of the ratchet wheel $H^4$.

A hooked arm $J^4$ is provided on the lever J in such a position as to be adapted to engage with a convenient part of the mechanism of the meter to stop the supply when the quantity paid for is consumed. For example the hooked arm $J^4$ is adapted in one position to engage with and lock the crank K, Fig. 3, of the ordinary meter mechanism. The path of this crank is indicated in Figs. 4, 8 and 9 by the dotted lines $K^0$. In the chronometric form of the apparatus hereinafter described I connect this arm to the stop valve for shutting off the supply, and when applied to an electric meter I connect said arm to a switch as hereinafter described. I also in some instances as applied to the quantitative measuring apparatus connect the arm $J^4$ to a stop valve so as to open and close the same in accordance with the movements of said arm.

The lever J is extended below the pivot J', and a sliding piece $J^5$ is pivoted thereto at $J^6$. Said piece works in a guide A' formed on the frame A and rests on a roller $J^7$ carried by the said frame.

L is a spindle capable of rotating in a bearing in the frame A. The said spindle extends outside the casing and is furnished with a handle L' for turning the same. On the inner end of this spindle is fixed a coin-holder $L^2$ shaped as shown in Fig. 6, that is to say, with a slotted part $L^3$ that allows of coins smaller than those of the proper size to pass through, and with curved parts $L^4$, $L^4$ to receive and form a bearing for coins of the right size. The handle L' can be turned in one direction only, its spindle being furnished with a strong ratchet wheel $L^5$ with which engage preferably double pawls $L^6$, $L^6$ pivoted to the frame A. Said pawls are arranged one slightly in advance of the other, and operate alternately in the well known manner to prevent rotation of the handle in the backward direction. When a coin $L^0$ of the right size is dropped into the holder $L^2$, and the handle L' is rotated, the edge of the coin is brought into contact with the above-mentioned sliding piece $J^5$ and is caused to force the same backward, thus turning the lever J about its pivot and actuating the lever I'. By this means the pawl I is first put into engagement with the teeth of the ratchet wheel $H^4$ and then caused to turn said wheel, and so move the pinion H one or more teeth forward as may be desired, in which position it is held by means of the spring pawl $H^3$ hereinbefore described engaging in the second pinion.

The coin is passed through a slit $l$ see Fig. 12 provided in the outer case or covering of the mechanism and is guided to the rotating coin-holder by means of a suitable chute $l'$. After operating the mechanism, as above described, the coin is passed through a delivery chute M and into a money box or receptacle M' provided for the purpose.

The coin-holder is, as before stated, slotted so that any smaller coin than that required to be tendered falls through and into the money box without coming into contact with the operating mechanism. I prefer that the coin of proper dimensions after working the mechanism on being rotated in the holder as above described shall be made to pass between suitable springs N, N, Fig. 7 in the delivery chute, which springs nip the coin and operate to draw it out of the holder, thus preventing the same from sticking or becoming fixed by grease or like substance. The coin is only held by the said springs during part of the revolution of the handle, and is forced from between the same by the coin-holder as the latter completes its rotation. The coin then falls into the money box M'. The ratchet wheel $L^5$ and pawls fixed to the frame engaging therewith prevent the operation known as "pumping" or working the coin backward and forward by which an excessive supply of gas might be obtained by the coin. A further safeguard against fraudulent use of the meter is provided by a stop O which is pivoted to the frame A at O' and is weighted and adapted when released to engage and lock the crank K. This stop is normally held clear of the crank K by means of a pin $O^2$ fixed in the hooked arm $J^4$ of the lever J, which pin presses on the edge $O^3$ of the stop. Immediately the coin-holder is rotated with the coin held therein, thus moving the prepayment mechanism and raising the arm $J^4$, the stop O is liberated, and a part $O^4$ thereof comes into the path of the crank K and arrests said crank thus stopping the supply of gas, or other fluid, until the coin is so far rotated as to clear the mechanism and fall into the money box, whereupon the lever J is drawn back by its spring $J^3$, and the arm $J^4$ is depressed again and the pivoted stop is thereby removed from the path of the crank, thus allowing the latter to turn. The arm $J^4$ and the pivoted stop O have each three positions of rest, viz: first, as shown in Fig. 9 where the hook of the arm $J^4$ is in the path of the crank and operates to prevent the rotation thereof; second, as shown in Fig. 8 where the coin is passing through the machine and the stop O then operates to lock the crank; and third as shown in Fig. 4 where the crank is free to rotate, its path lying between the hook of the arm $J^4$ and the part $O^4$ of the pivoted stop O. This position of the arm $J^4$ is assumed when the finger $J^2$ of the lever J is resting against the rims or flanges $D^2$, F' of the wheels D, F, and the position shown in Fig. 9 is assumed when the notches $D^3$, $F^2$ in the rims $D^2$, F' are opposite each other and under the part $J^2$ of the lever J, in which position of the said notches the said part $J^2$ can drop thereinto thus allowing the hooked arm $J^4$ to descend into the path of the crank K. I sometimes provide in lieu of the pivoted stop O a catch lever $s$, Fig. 4$^a$, pivoted at $s'$ and adapted to be controlled by a cam $s^2$ on the spindle L of the handle L'. Said cam $s^2$ moves the lever $s$ into engagement with the crank K of the meter mechanism, prior to the disengagement of the hooked arm $J^4$ from said crank, and releases the crank again when the handle L' has been turned sufficiently to deliver the coin.

A slotted link P connects a crank pin P' in the rotating coin-holder $L^2$ with the slide $J^5$ with which the coin comes in contact, so that should the springs $J^3$, $I^4$ which keep the levers J, I' in their normal positions fail to act on a coin being passed through, this link will operate to draw the slide and levers back into their proper positions. The slot $P^2$ in the link P allows the coin-holder to turn without affecting the lever J when the latter is in its normal position resting against the rims $D^2$, F' of the wheels D, F.

The wheel F is the wheel which is actuated by the meter mechanism, and as before stated it may be geared directly to the said mechanism, as shown in Figs. 10 and 11, or it may be actuated by a reciprocating movement obtained from the crank pin in a wheel or disk operated by the meter mechanism as shown in Fig. 2 as follows: That is to say, Q is an arm loosely mounted on the boss of the wheel F and connected by a link Q' with a crank pin $Q^2$ in a wheel $Q^3$ driven from a suitable rotating shaft of the meter mechanism, say the shaft $Q^0$ which in some meters is commonly known as the two-feet shaft. $Q^4$ is a silent-feed pawl slotted at $Q^5$, as shown in Fig. 5, to fit loosely on a circular rim $F^4$ formed on the side of the wheel F. The inner end of the pawl $Q^4$ rests in a recess $Q^6$ in the hub of the arm Q, and its outer end is connected by a spring $Q^7$ with the radial arm $Q^8$ fixed to the boss of the arm Q. When moved in one direction the pawl grips the aforesaid rim $F^4$ and causes the wheel F to travel with it, but when drawn back it slides over said rim without moving the wheel. This arrangement is convenient when it is desired to vary the volume of gas or other fluid passed, or electricity passed for a coin of certain value. The capability of varying the feed is obtained by connecting the link Q' to a nut $Q^9$ which can be moved to and fro in a radial slot $q$ in the lever or arm Q by means of a screw $q'$, thus permitting a varying stroke to be given to the pawl. The nut $Q^9$ can be locked in any desired position to which it may be set by a lock nut $q^2$.

The action of the above described mechanism is as follows: When the meter is stopped and no coin has been tendered, the finger E stands at zero, and the grooves or slots $D^3$, $F^2$ in the two rims or flanges $D^2$, F' respectively on the toothed wheels D, F are opposite that part $J^2$ of the lever J which rests on the said rims or flanges. Consequently the said part $J^2$ of the lever J has been forced into the slots or grooves by means of the spring $J^3$ thus depressing the hooked arm $J^4$ into the path of the crank K and arresting the supply of gas. On a suitable coin being inserted and passed through the apparatus by rotating the coin-holder $L^2$, the lever J is thereby turned and the part $J^2$ is drawn out of the slots or grooves $D^3$, $F^2$ in the wheels D, F thus unlocking said wheels, and at the same time, the pawl I on the lever I' is advanced and caused to turn the ratchet wheel $H^4$ thereby turning the wheel D one or more teeth in the opposite direction to that in which the said wheel is rotated by the motion communicated by the meter mechanism. The slots $D^3$, $F^2$ are thus separated a distance equal to one tooth; and the part $J^2$ of the lever J which extends across the whole space between the wheels D, F cannot fall into the slots until they are brought together again, but rests on the rims $D^2$, F'. Simultaneously with the aforesaid movements, the arm $J^4$ of the lever J is raised and releases the crank K thus allowing the meter mechanism to rotate and a supply of gas or other fluid to be obtained. As before described however the pivoted stop O or the lever S operates to lock the crank K until the coin has been delivered into the money box, and the arm $J^4$ has so far descended that the part $J^2$ of the arm J rests on the flanges $D^2$ F' of the wheels D, F. When the wheel F which has the larger number of teeth (which wheel is in gear with the mechanism of the meter) has been carried completely round as the gas or other fluid or electricity is consumed, then the slots or grooves in the wheels are brought opposite to each other again, and the part $J^2$ of the lever J falls into the slots or grooves before mentioned thus arresting the supply once more. The pointer E is at the same time brought back to zero on the dial. Any number of coins may be inserted successively at one time provided the pointer is not thereby carried round one complete revolution of the dial, and it will be seen that before the slots $D^3$, $F^2$ are brought together again the wheel F must make as many turns as the number of coins inserted.

Figs. 10 and 11 show a modified form of my apparatus wherein the silent feed is substituted by toothed gear for driving the wheel F, and wherein the springs $I^4$ and $J^3$ are replaced by weights $I^6$ and $J^8$ respectively. The arm $I^5$ of the pawl I is also slotted and is connected directly to the arm J by a pin $J^9$ fixed in the upper end of said arm. The coin-holder $L^2$ and slide $J^5$ are also dispensed with, and in lieu thereof I have provided a curved extension $J^0$ of the lever J, in combination with a curved cam-piece $L^7$ fixed or formed on the spindle L of the handle L'. The coin is received between the curved extension $J^0$ and the cam-piece $L^7$, and when the handle is turned round, and the said cam piece $L^7$ operates to force the coin past the curved extension $J^0$ of lever J into the delivery chute, and in so doing turns the lever J and operates the mechanism as before described. In other respects the mechanism of Figs. 10 and 11 is like that of Figs. 2 to 4. The curved extension $J^0$ might be used in combination with the coin-holder $L^2$ if desired.

I sometimes provide a stop to come into action and prevent further insertion of coin after a sufficient number have been inserted. A convenient construction for this purpose comprises a collar R, Fig. 12 that can slide on the boss of the wheel F. Said collar is furnished with a pin R' which projects through a hole in the wheel F and is adapted to be operated by an incline $R^2$ on the wheel D. Said incline comes opposite the pin R' just before the wheel D has made a complete revolution with respect to the wheel F and then pushes the pin R' outward and thus slides the collar R along the boss of the wheel F. This movement of the collar operates through a lever $R^3$, pivoted at $R^4$ to the frame, to move a slide $R^5$ across the coin slit $l$ and so shut said slit and prevent any coins being inserted thereat, until the wheel D has so far moved backward with respect to the wheel F as to liberate the pin R' and allow the same to be pushed in again by the spring $R^6$ which presses against the collar R. I also provide in some instances a bell to give warning when the supply is about to be discontinued through neglect to insert coin for a further supply. Such a bell is shown in Figs. 13 and 14.

T is the bell, supported by a frame T' which is pivoted at T² to the frame A.

T³ is a slotted arm of the frame T' which arm engages a pin T⁴ on the locking arm J⁴ of the lever J.

When the apparatus is working, the tail end T⁵ of the spring-controlled clapper of the bell is held out of the path of the crank K, but by slightly depressing the arm J⁴ the said tongue can be brought into the path of the said crank, and the bell will then be rung at each revolution of the crank. The arm J⁴ is lowered sufficiently for this purpose just before the complete stoppage of the supply of gas or other fluid by notches or depressions T⁶ provided in the rims D², F' of the wheels D and F. The part J² of the arm J falls into said notches or depressions just before the notches D³, F² arrive under said part J², and the bell is thereby lowered to such a position that the tail end of the clapper will be struck by the crank K and the bell thus rung as the said crank rotates.

The device illustrated in Figs. 15 to 17 is another means used in some instances in lieu of the pawls L⁶, L⁶ to prevent the operation known as "pumping." It consists of a bracket S hinged at S' to the frame, and having ratchet teeth S² with which engages a tooth S³ formed on the extension J⁰ of the lever J so as to permit of said lever moving in one direction only while so engaged. In order to release the lever J to allow it to return after the coin has been delivered, I provide a pin L⁸ on the cam piece L⁷ which pin at the proper moment in the rotation of the handle L' engages an incline S⁴ formed on an arm S⁵ of the bracket S and swings said bracket backward thus releasing the arm J and allowing it to return to rest on the rims of the wheels D and F.

In applying my invention to chronometric measuring apparatus I use the same arrangement of differential wheels, pinions, and levers, substantially as above described but in lieu of utilizing the meter mechanism to work the same I provide any well known form of spring time measuring mechanism controlled by a pendulum, or preferably by a balance. I gear the wheel F with this time measuring mechanism, always so proportioning the gear that the said wheel may make one complete revolution in the time that it is determined the supply of gas or other fluid or electricity should be given in exchange for the coin arranged to be inserted for the same. Such a device is shown in Fig. 18.

U is the supply pipe for gas or other fluid.
U' is a stop-cock.
U² is a modified double beat stop valve controlled by the coin-freed apparatus. The arm J⁴ is connected to the spindle U³ of the valve U² preferably through the intervention of a spring U⁴. The said arm J⁴ is also connected by a link V, arm V', pawl V² and ratchet wheel V³ with the drum of the main spring W of the clock mechanism, so that when the arm J⁴ is raised it operates to partially wind up the spring of the clock mechanism and so provide the requisite power for keeping the clock-work in motion. An arm V⁴ is also provided to insure that the clock mechanism shall be started whenever the arm J⁴ is raised. Said arm may be conveniently connected to the arm V' and arranged to move the pendulum to one side when the latter is raised, and when the arm V' is lowered it releases the pendulum and the latter then commences to swing.

The double beat valve U² serves not only to close the supply pipe when the arm J⁴ is in its lowest position, that is when the supply prepaid for is exhausted, but also when the said arm is in its highest position, that is when the coin is passing through the apparatus. It is impossible therefore to obtain a supply of gas or other fluid until the coin has passed quite through the apparatus. The three positions of the valve and of its controlling levers are shown in Figs. 19, 20 and 21, the same corresponding with the three positions of the arm J⁴ and stop O illustrated respectively in Figs. 9, 4 and 8. U⁵ is an arm attached to the stop-cock U' and traversing the path of the pendulum. When the cock is open, the arm is moved out of the way of the pendulum and the latter is free to swing, but when the cock is shut the said arm operates to stop the pendulum. The consumer has thus a means of stopping the clockwork when he is not using any fluid.

Fig. 22 shows the application of the same device for measuring electricity. The arm J⁴ is connected by a link Z to a switch Z' and serves to switch the current on and off by its movements. Its three positions corresponding with those of the valve in Figs. 19, 20 and 21 are shown in Figs. 23, 24 and 25. The means for stopping the pendulum simultaneously with the supply consists of an arm Z² attached to the switch Z³, which arm arrests the pendulum when the switch is turned off. As in the device shown in Fig. 18, an arm is provided to swing the pendulum to one side when the arm J⁴ moves upward, to insure that the pendulum shall be started when the arm J⁴ descends again. It is obvious that the above mechanism can be applied to clockwork having a balance wheel in lieu of a pendulum.

In a modification of my invention, instead of using the coin as a direct part of the mechanism for actuating the differential wheel D, I merely use it to liberate the handle L' as follows: That is to say, a, Fig. 26, is a loaded catch lever for locking the handle by means of its hook a' engaging a corresponding hook on the spindle L. This lever is pivoted at $a^2$ and projects into the coin chute $l'$. The coin delivered into the said chute falls on the end of said catch lever and by its weight overcomes the loaded end, depresses the catch lever and passes through into the delivery chute. A pin $a^3$ fixed in the end of the catch lever projects through a slot $a^4$ in the side of the chute. When the catch lever is depressed, the said pin $a^3$ turns, and slides past, a weighted catch $a^5$ which catch operates to prevent the lever $a$ from returning so that the handle L is not locked again. The handle is connected to the lever J by a slotted link $b$ and is connected with the catch $a^5$ by another slotted link $a^6$. When the said handle is turned to move the wheel D, the link $a^6$ operates to raise the catch $a^5$ and thus allows the catch lever $a$ to return to its normal position wherein it locks the handle. The slot in the link $b$ allows of the required movement of the lever J independently of the handle L'.

I may apply the herein described mechanism to any kind of wet or dry gas meter, electric or other meters and also to chronometric apparatus for gas, electricity or other fluids, always employing the same or a similar arrangement of differential wheels, pinions, levers and pawls and any well known stop valve or switch for stopping the supply of gas or other fluid when the supply paid for is consumed.

What I claim is—

1. In coin-freed apparatus, the combination, with driving mechanism, of a train of wheels, constituting a differential system, two of the wheels in the train being mounted on the same spindle and connected together by a spring which allows of one being turned relatively to the other, companion notches in the flanges of said differential wheels, and the spring controlled coin-operated lever which engages said notches when the same are in line and locks the wheels, substantially as described for the purpose specified.

2. In coin-freed apparatus, the combination, with driving mechanism, of a train of wheels constituting a differential system, two of the wheels in the train being mounted on the same spindle and connected together by a spring which allows of one being turned relatively to the other, substantially as described for the purpose specified.

3. In coin-freed apparatus, the combination, with driving mechanism, of a train of wheels constituting a differential system, two of the wheels in the train being mounted on the same spindle and connected together by a spring, and means for turning one of said wheels with respect to the other, said means comprising a ratchet wheel and pawl, and the coin-operated lever engaging with said pawl, substantially as described.

4. In coin-freed apparatus, the combination, with driving mechanism, of a train of wheels constituting a differential system, two of the wheels in the train being mounted on the same spindle and connected together by a spring, means for turning one of said wheels with respect to the other, said means comprising a ratchet wheel and pawl, the coin-operated lever engaging with said pawl, the coin holder, and the slot through said coin holder for passing coins not of the proper size, substantially as described.

5. In coin-freed apparatus, the combination, with driving mechanism, of a train of wheels constituting a differential system, two of the wheels in the train being mounted on the same spindle and connected together by a spring, means for turning one of said wheels with respect to the other said means comprising a ratchet wheel and pawl, the coin-operated lever engaging with said pawl, the coin-holder, the slot through said coin-holder for passing coins not of the proper size, and the spring-device in said holder for preventing the coins sticking in the holder, substantially as described.

6. In coin-freed apparatus, the combination, with driving mechanism, of a train of wheels, constituting a differential system, companion notches in the flanges of said differential wheels, and the spring controlled coin-operated lever which engages said notches when the same are in line, a hooked arm $J^4$ on said lever J for arresting the meter mechanism when the lever engages the notches aforesaid, and a pawl having a stop piece $O^4$ which arrests the meter mechanism when the pawl is freed by the arm $J^4$, said arm having a pin $O^2$ to control the position of the pawl, substantially as described.

7. In coin-freed apparatus, the combination, with the differential wheel mechanism, of driving mechanism therefor, and means for adjusting the speed of said differential mechanism, substantially as, and for the purpose, specified.

8. In coin-freed apparatus, the combination, with the differential wheel mechanism, of driving mechanism therefor, and an adjustable silent feed-device intermediate of said differential wheel mechanism and the driving mechanism, substantially as described, for the purpose specified.

9. In coin-freed apparatus, the combination of the differential wheel mechanism, two of the wheels of which are mounted on the same spindle and connected together by a spring which allows of one being turned relatively to the other, the spring controlled coin-operated lever, the operating handle, and the slotted link P connecting the aforesaid lever with the handle, and serving to insure the return of the lever to its initial position after the same has been displaced by passing a coin through the machine, substantially as described.

10. In coin-freed apparatus, the combination with the differential wheel mechanism, of driving mechanism therefor, a case, a coin slot in said case, a slide for closing said slot, means carried by one of the differential wheels by which the position of the said slide can be adjusted, and an incline $R^2$ on the companion wheel for controlling or actuating said means, substantially as described.

11. In coin-freed apparatus, the combination of the differential wheel mechanism, the depressions $T^6$ provided in the flanges of the differential wheels, the coin-operated lever J, the audible signal device connected with said lever, and the striking arm K connected with the meter mechanism and adapted to operate the signal when the latter is allowed by the depressions $T^6$ to move into the path of the arm, substantially as described.

12. In coin-freed apparatus, the combination of a differential wheel mechanism, companion notches in the flanges of the differential wheels, a clock mechanism for driving the said wheels, the coin-operated lever J connected with the winding part of the clock train, and means controlled by the lever J for stopping the supply of the commodity afforded by the apparatus when the lever engages the aforesaid notches, substantially as described.

13. In coin-freed apparatus, the combination of a differential wheel mechanism, companion notches in the flanges of the differential wheels, a clock mechanism for driving the said wheels, the coin-operated lever J connected with the winding part of the clock train, the supply-pipe U and a valve $U^2$ in said pipe and connected with the lever J whereby the supply of fluid is stopped when the said lever engages the aforesaid notches, substantially as described.

14. In coin-freed apparatus, the combination of a differential wheel mechanism, companion notches in the flanges of the differential wheels, a clock mechanism for driving the said wheels, the coin-operated lever J connected with the winding part of the clock train, means for arresting the clock train when the supply of the commodity afforded by the apparatus is temporarily stopped by the user, and for starting the clock train again when the supply is continued, and means controlled by the lever J for stopping the supply of the commodity when the lever J engages the aforesaid notches, substantially as described.

15. In coin-freed apparatus, the combination of a differential wheel mechanism, companion notches in the flanges of the different wheels, a clock mechanism for driving the said wheels, the coin-operated lever J connected with the winding part of the clock train, the supply-pipe U, a valve $U^2$ in said pipe and connected with the lever J whereby the supply of fluid is stopped when the said lever engages the aforesaid notches, a stop valve $U'$ in the pipe U, an arm $U^5$ connected with said valve and adapted to engage and arrest the pendulum of the clock train at one end of the latter's swing when the valve is shut and to be free of the pendulum when the valve is open, substantially as described, for the purpose specified.

16. In coin-freed apparatus, the combination of a differential wheel mechanism, companion notches in the flanges of the differential wheels, a clock mechanism for driving the said wheels, the coin-operated lever J connected with the winding part of the clock-train, and means connected with the lever J for starting the clock train when the said lever is operated by the passage of a coin through the apparatus, substantially as described.

In testimony whereof I have hereunto set my hand this 17th day of February, 1894.

STEPHEN SIMPSON.

Witnesses:
JOHN POYSER,
*Sherwood Road, Mansfield.*
EDMUND SIMPSON,
*Bridge Street, Mansfield.*